US008285735B2

(12) United States Patent
Crossley et al.

(10) Patent No.: US 8,285,735 B2
(45) Date of Patent: Oct. 9, 2012

(54) SYSTEM AND METHOD FOR CREATING METADATA

(75) Inventors: Brett Crossley, Fort Mill, SC (US);
Andrew Jenkins, Charlotte, NC (US);
Jeff Rayfield, Charlotte, NC (US)

(73) Assignee: PacketVideo Corporation, San Diego, CA (US)

( * ) Notice: Subject to any disclaimer, the term of this patent is extended or adjusted under 35 U.S.C. 154(b) by 0 days.

(21) Appl. No.: 13/200,492

(22) Filed: Sep. 23, 2011

(65) Prior Publication Data
US 2012/0023099 A1 Jan. 26, 2012

Related U.S. Application Data

(63) Continuation of application No. 12/315,667, filed on Dec. 5, 2008, now Pat. No. 8,065,325.

(60) Provisional application No. 61/007,408, filed on Dec. 12, 2007.

(51) Int. Cl.
*G06F 7/00* (2006.01)
*G06F 17/30* (2006.01)

(52) U.S. Cl. .................. 707/758; 707/796; 707/E17.02; 707/E17.041; 707/E17.042; 725/37; 725/46; 455/423; 455/439

(58) Field of Classification Search .................. 707/758, 707/780, E17.02, E17.041, E17.042, 796; 725/37, 46; 455/422.1, 426.1, 439, 423
See application file for complete search history.

(56) References Cited

U.S. PATENT DOCUMENTS

| 6,374,260 | B1 * | 4/2002 | Hoffert et al. | 707/999.104 |
| 7,130,616 | B2 * | 10/2006 | Janik | 455/412.1 |
| 2002/0013852 | A1 * | 1/2002 | Janik | 709/231 |
| 2006/0252534 | A1 * | 11/2006 | Walker et al. | 463/31 |
| 2006/0282415 | A1 * | 12/2006 | Shibata et al. | 707/3 |
| 2007/0067301 | A1 * | 3/2007 | Malik | 707/10 |
| 2007/0282907 | A1 * | 12/2007 | Chambers | 707/104.1 |
| 2008/0195664 | A1 * | 8/2008 | Maharajh et al. | 707/104.1 |
| 2008/0201225 | A1 * | 8/2008 | Maharajh et al. | 705/14 |

OTHER PUBLICATIONS

Baud Haryo Prananto, Ig-Jae Kim and Hyoung-Gon Kim—"Multi-Level Experience Retrieval for the Personal Lifelog Media System"—SITIS'07 Third International IEEE Conference on Signal-Image Technologies and Internet-Based System, Dec. 16-18, 2007 (pp. 175-182).*

Claudiu S. Firan, Wolfgang Nejdl and Raluca Paiu—"The Benefit of Using Tag-Based Profiles"—Web Conference, 2007. LA-WEB 2007. Latin American—Oct. 31, 2007-Nov. 2, 2007 (pp. 32-41).*

* cited by examiner

*Primary Examiner* — John E Breene
*Assistant Examiner* — Anh Ly
(74) *Attorney, Agent, or Firm* — Patents+TMS, P.C.

(57) ABSTRACT

A system and a method create metadata for media files. The metadata may be information relating to, based on and/or associated with the media files. The metadata of the media files may be searched by one or more terminals. An event database connectable to a terminal may use a location, a date and/or a time of creation of the media files to associate specific events with the media files. Further, the specific events may be used by the database to create keywords associated with the media files. As a result, the system and the method may organize and/or may provide searching for media files. A web page may be generated for an event that accumulates the media files related to the event.

20 Claims, 2 Drawing Sheets

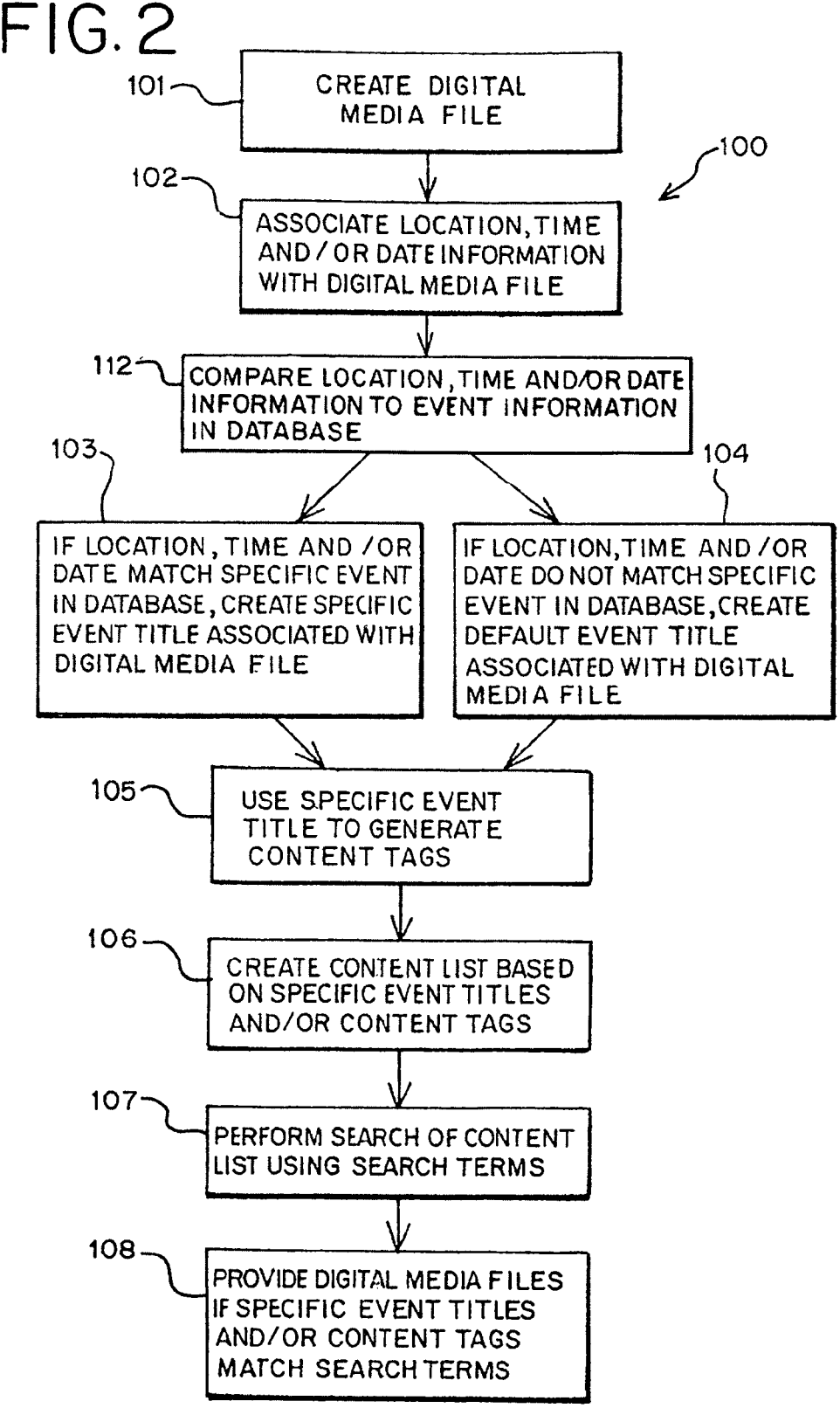

SYSTEM AND METHOD FOR CREATING METADATA

This application is a continuation application of U.S. Non-Provisional application Ser. No. 12/315,667, now U.S. Pat. No. 8,065,325, filed Dec. 5, 2008, which claims the benefit of U.S. Provisional Application Ser. No. 61/007,408, filed Dec. 12, 2007.

BACKGROUND OF THE INVENTION

The present invention generally relates to a system and a method for creating metadata. More specifically, the present invention relates to a system and a method for creating metadata for media files that uses an event database to provide metadata keywords for organizing, indexing and/or searching the media files. The event database uses a location where the media file was created and/or a date and/or a time that the media file was created to determine a specific event that corresponds to the media file. A specific event title may become part of the metadata to indicate the specific event that corresponds to the media file. Based on the specific event, the event database provides the metadata keywords. The media files may be indexed, may be consumed, may be accessed and/or may be viewed by one or more users via terminals over a network. Based on the metadata created by the database of events and/or associated with the media files, one or more users may obtain and/or may access the media files over the network via a search that may use matching keywords. An event page may be provided that accumulates media files identified by the event database as corresponding to a specific event.

Generally known devices may capture, may store and/or may send digital media. Digital media capture devices traditionally record basic metadata, such as, for example, a time and/or a date. A user may download, may display, may access, may obtain and/or may view the digital media from a database via a terminal over a network. Applications on the digital media capture devices generally allow transfer of the digital media across the network, such as, for example, using Multimedia Messaging Service (MMS) or Hypertext Transfer Protocol (HTTP).

The addition of Global Positioning System (hereinafter "GPS") support to many mobile devices opens up a whole new frontier for mobile application development, such as, for example, the application of location information to the digital media created by the digital media capture devices. One such example is ZoneTag by Yahoo, Inc. (http://zonetag.research.yahoo.com) which associates location information with digital media and uploads the digital media to a social network site.

The social network site is a website or application that has content created primarily by users of the social network site and shared with other users of the social network site. Media content is described and/or classified by the users. Often, the media content is in the form of user-created keywords that are entered by the originating user and/or the other users. Typically, the other users may execute an application to locate, to identify and/or to search the digital media in the database. A searchable index of the media files may be used by the application to locate the media content accessible via the social network site. Metadata associated with the media files provides keywords that may indicate that the media files are associated with a search term. Popular social networks with an emphasis on digital media include MySpace (registered trademark of MySpace, Inc.), Flickr (registered trademark of Yahoo, Inc.), and YouTube (trademark of YouTube, Inc.).

Tagging is the association of the keywords with the media files. Tagging may include a strength of association between the keywords and the media files. Tagging may be a mechanism for classifying the media files so that the media files may be organized and/or may be searched. Tagging is the primary basis of organization for most popular media-centric social networks. As a result of tagging, the users of social network sites may search the media files using the keywords relating to the media content accessible by the social network site. However, the users who generate the digital media files must also generate the associated keywords. Thus, the keywords associated with, corresponding to and/or assigned to the multimedia file may be inaccurate, unreliable and/or incorrect based on the attributes of the multimedia file. Further, if the user generates the keywords when the digital media file is created, exerting effort and/or use of time to generate the keywords may affect, may alter and/or may detract from the experience of the event captured by the digital media file. Still further, the user may be incapable of generating the keywords when the digital media file is created; therefore, the digital media file lacks keywords and is not provided for the searchable index.

A need, therefore, exists for a system and a method for creating metadata for media files. Further, a need exists for a system and a method for creating metadata for media files that use an event database to provide metadata keywords. Still further, a need exists for a system and a method for creating metadata for media files that use an event database to index media files, media content and/or multimedia. Still further, a need exists for a system and a method for creating metadata for media files that associate media files with specific event titles. And, a need exists for a system and a method for creating metadata for media files that maintains consistency in metadata keywords. And, a need exists for a system and a method for creating metadata for media files that creates metadata without user interaction. Moreover, a need exists for a system and a method for creating metadata for media files that may generate a web page for an event that accumulates the media files related to that event.

SUMMARY OF THE INVENTION

The present invention generally relates to a system and a method for creating metadata for media files. The metadata may be information relating to, based on and/or associated with the media files. The metadata of the media files may be searched by one or more terminals. An event database connectable to a terminal may use a location, a date and/or a time of creation of the media files to associate specific events with the media files. Further, the specific events may be used by the database to create keywords associated with the media files. As a result, the system and method may organize and/or may provide searching for media files. A web page may be generated for an event that accumulates the media files related to the event. Such a web page may include the media files related to the event that are created by a specific user and/or the media files related to the event that are created by multiple users.

To this end, in an embodiment of the present invention, a method for creating metadata is provided. The method has the steps of providing a database of a plurality of events wherein each of the plurality of events is associated with event details; creating a first media file at a first location; associating a first content tag with the first media file; comparing the first content tag to the event details of the plurality of events; determining a matching event from the plurality of events wherein the event details of the matching event correspond to the first content tag associated with the first media file; associating a second content tag with the first media file wherein the second content tag is based on the matching event; creating a content list that lists the first media file and a second media file wherein the second media file has a third content tag; accepting user input that provides a parameter; and displaying search results wherein the search results indicate the first media file if the second content tag corresponds to the parameter and further wherein the search results indicate the second media file if the third content tag corresponds to the parameter.

In an embodiment, the method has the step of indicating a location where the first media file was created wherein the first content tag associated with the first media file indicates the location.

In an embodiment, the method has the step of indicating a time and a date that the first media file was created wherein the first content tag associated with the first media file indicates the time and the date.

In an embodiment, the method has the step of transmitting the first media file to a second location wherein the second location is remote relative to the first location and further wherein the first media file is transmitted in response to selection of the first media file from the content list.

In an embodiment, the method has the step of transmitting a message that indicates a newly available media file that has a fourth content tag wherein the fourth content tag corresponds to the parameter.

In an embodiment, the method has the step of displaying a webpage for one of the plurality of events wherein the first media file is available via the webpage if the second content tag associated with the first media file indicates that the first media file was created at the event.

In an embodiment, the method has the step of connecting a server to a network wherein a terminal is connected to the network and further wherein the server transmits the search results to the terminal via the network.

In another embodiment of the present invention, a method for creating metadata is provided. The method has the steps of providing a database of a plurality of events wherein each of the plurality of events is associated with event information; creating a first media file with a media capturing device; associating file information with the first media file; comparing the file information to the event information; determining if one of the plurality of events is a matching event wherein the event information of the matching event corresponds to the file information; associating a first title with the first media file wherein the first title is based on the matching event if the plurality of events has the matching event and further wherein the first title is a default title if the plurality of events does not have the matching event; and associating a content tag with the first media file wherein the content tag is based on the first title.

In an embodiment, the method has the step of comparing user input to content tags associated with media files wherein the first media file is provided if the content tag associated with the first media file corresponds to the user input.

In an embodiment, the method has the step of displaying a webpage for a venue wherein the first media file is available via the webpage if the content tag indicates that the first media file was created at the venue.

In an embodiment, the method has the step of transmitting the first media file to a terminal wherein the first media file is transmitted in response to user input that corresponds to the content tag.

In an embodiment, the method has the step of connecting the media capturing device to a network wherein the first media file is transmitted to a remote terminal via the network.

In an embodiment, the media file is a digital photograph.

In another embodiment of the present invention, a system for creating metadata is provided. The system has a network; a media capturing device connected to the network wherein the media capturing device creates a first media file and further wherein the media capturing device determines a location of the media capturing device when the first media file was created wherein the media capturing device determines a time and a date that the first media file was created and further wherein the media capturing device transmits the first media file to the network; and a database connected to the network wherein the database has a plurality of events and further wherein each of the plurality of events is associated with event information wherein the database compares the event information to the location of the media capturing device when the first media file was created and the time and the date that the first media file was created wherein the database associates the first media file with a matching event of the plurality of events and further wherein the event information of the matching event corresponds to the location of the media capturing device when the first media file was created and the time and the date that the media file was created wherein the database associates a first content tag with the first media file wherein the first content tag is based on the matching event.

In an embodiment, the system has a terminal connected to the network wherein the network transmits the first media file to the terminal in response to user input that corresponds to the first content tag.

In an embodiment, the system has a webpage accessible by the network wherein the webpage provides media files associated with one of the plurality of events wherein the first media file is available via the webpage if the first content tag associated with the first media file indicates that the first media file was created at the event.

In an embodiment, the system has a content list that lists the first media file and a second media file wherein the second media file has a second content tag.

In an embodiment, the system has a camera associated with the media capturing device wherein the camera generates an image associated with the first media file.

In an embodiment, the media capturing device has a GPS receiver that determines the location of the media capturing device when the first media file was created.

In an embodiment, the system has a content provider connected to the network wherein the content provider transmits a message that indicates availability of the first media file from the provider if the first content tag corresponds to a parameter.

It is, therefore, an advantage of the present invention to provide a system and a method for creating metadata for media files.

Another advantage of the present invention is to provide a system and a method for creating metadata for media files that may use an event database to provide metadata keywords.

And, another advantage of the present invention is to provide a system and a method for creating metadata for media files which use an event database to index media files, media content and/or multimedia.

Yet another advantage of the present invention is to provide a system and a method for creating metadata for media files that associate media files with specific events.

A further advantage of the present invention is to provide a system and a method for creating metadata for media files that may maintain consistency in metadata keywords.

And, another advantage of the present invention is to provide a system and a method for creating metadata for media files that may organize the media files of a social network site.

Yet another advantage of the present invention is to provide a system and a method for creating metadata for media files which may create metadata without user input.

A still further advantage of the present invention is to provide a system and a method for creating metadata for media files which may link media files to other media files related to a similar event.

And, another advantage of the present invention is to provide a system and a method for creating metadata for media files which may provide a standard format for the metadata.

Moreover, an advantage of the present invention is to provide a system and a method for creating metadata for media files which may identify media files related to a specific event.

Additional features and advantages of the present invention are described in, and will be apparent from, the detailed description of the presently preferred embodiments and from the drawings.

BRIEF DESCRIPTION OF THE DRAWINGS

FIG. 2 illustrates a flowchart of a method for creating metadata in an embodiment of the present invention.

DETAILED DESCRIPTION OF THE PREFERRED EMBODIMENTS

Figure 1:
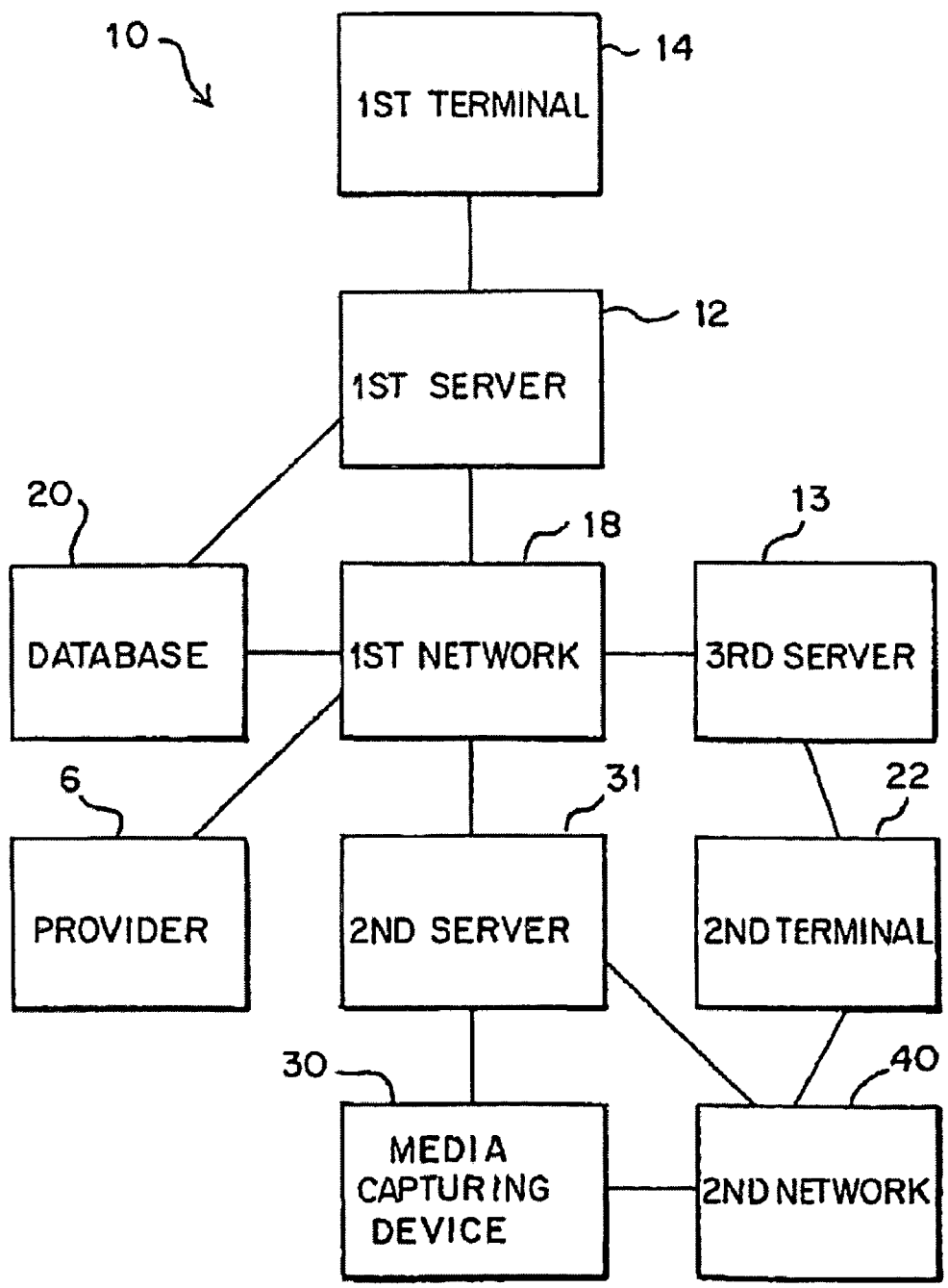
FIG. 1 illustrates a black box diagram of a system for creating metadata in an embodiment of the present invention.

The present invention generally relates to a system and a method for creating metadata for media files. The metadata of the media files may be searched by one or more terminals. A database connectable to a terminal may use location, date and/or time information to associate the media files with specific events. Further, the specific event associated with a media file may be used to create other keywords associated with the media file. As a result, the system and method may organize and/or may provide searching for media files.

Referring now to the drawings wherein like numerals refer to like parts, FIG. 1 illustrates a system 10 which may have a first server 12 for connecting a first terminal 14 to a first data communication network 18 (hereinafter "the first network 18"). The first terminal 14 may be connected to and/or may be in communication with the first server 12. The first terminal 14, may be, for example, a computer terminal, a mobile device, a set-top box, and/or an electronic device which may be capable of transmitting, receiving, processing, accepting and/or displaying multimedia. The set-top box may be connected to a display (not shown in the figures) for viewing, for consuming and/or for displaying the multimedia. Alternatively, the set-top box may be, for example, a digital multimedia broadcasting-enabled television and/or the like. The first terminal 14 may be any terminal capable of transmitting, receiving, processing and/or displaying multimedia known to one having ordinary skill in the art.

A database 20 may be connected to and/or may be accessible by the first terminal 14 and/or the first server 12. As a result, the database 20 may be connected to the first network 18. The first terminal 14 may be local and/or may be remote with respect to the first server 12 and/or the database 20. The database 20 may be local or may be remote with respect to the first server 12. A provider 16 may be connected to the first network 18. The provider 16 may be, for example, a content service, a media store and/or the like. The present invention should not be limited to a specific embodiment of the provider 16. It should be understood that the provider 16 may be any provider as known to one of ordinary skill in the art.

The first network 18 may be, for example, an IP network, a wireless network, a wireline network, a local-area network, a wide-area network, a metropolitan area network, a paging network, a public switched telephone network and/or the like. The present invention should not be limited to a specific embodiment of the first network 18. It should be understood that the first network 18 may be any network capable of connecting and/or providing communication between the media capturing device 30, the first terminal 14 and/or the second terminal 22 as known to one having ordinary skill in the art.

A media capturing device 30 may be connected to the first network 18. The media capturing device 30 may be the same device as the first terminal 14. The media capturing device 30 may be a digital camera, a camcorder, a personal digital assistant ("PDA"), a 4G mobile device, a 3G mobile device, a 2.5G mobile device, an internet protocol (hereinafter "IP") video cellular telephone, an ALL-IP electronic device, a laptop computer and/or the like. The media capturing device 30 may create and/or may store the multimedia as shown at step 101 in FIG. 2. The multimedia may be a digital media file, such as, for example, a digital photograph; a musical composition; a radio program; a text composition; an audio book; an audio program; a media file that encodes audiovisual content, such as, for example, a television program, a movie, a music video, an animated work, a video program, a video game, and/or an audiovisual work; a soundtrack and/or a video track of a dramatic work; a film score; an opera; and/or the like. The present invention should not be limited to a specific embodiment of the digital media file and/or the media capturing device 30. It should be understood that the digital media file may be any digital media file and the media capturing device 30 may be any media capturing device as known to one of ordinary skill in the art. The media capturing device 30 may transfer the digital media file to the first terminal 14 via the first network 18.

The media capturing device 30 may be connected to a second server 31. The second server 31 may transfer the digital media file and/or the metadata from the media capturing device 30 to the first network 18. The database 20 may be stored in the media capturing device 30 and/or the first terminal 14. The database 20 may be remote from the media capturing device 30 and/or the first terminal 14.

Metadata may be associated with the digital media file created by the media capturing device 30. The metadata may be information, a communication and/or data relating to, based on and/or associated with the media files. The metadata may be formatted in a standard data format, such as, for example, XML, RDF, RSS, MathML, XHTML, SVG, cXML and/or the like. The metadata may have a first content tag. The first content tag may have location information, time information and/or date information. The location information may be provided by a GPS receiver in the media capturing device. GPS satellites may be positioned in orbit around earth and may provide signals to the GPS receivers. The signals may provide coordinates of the GPS receiver. Therefore, the media capturing device may use the coordinates provided by the GPS receiver to create location metadata for the digital media file as shown at step 102 of FIG. 2.

As shown at step 112 of FIG. 2, the location information, the date information and/or the time information may be compared to event information stored by the database 20. The database 20 may identify a specific event based on the location information, the date information and/or the time information as shown at step 103 of FIG. 2. A specific event title may be associated with the digital media file based on the specific event identified. The metadata may incorporate the specific event title. For example, the database may use the location information, the date information and/or the time information to determine a specific sporting event captured by the media capturing device 30. A specific sporting event title would be associated with the digital media file, that may, for example, indicate teams involved, a stadium, an outcome and/or the like. The specific sporting event title may become part of the metadata. As a further example, the database may use the location information, the date information and/or the time information to determine a specific concert performance captured by the media capturing device 30. A specific performance title may be associated with the digital media file that may indicate, for example, musicians, a venue, a name of an album and/or the like. The specific performance title may become part of the metadata.

If the specific event title cannot be generated, a default event title may be generated as shown at step 104 of FIG. 2. For example, if the database 20 does not have an entry for the event captured in the digital media file, the default event title may be generated based on the location information of the media capturing device 30 so that the default event title indicates a nearby location of interest such as a stadium, a concert venue, a tourist attraction, a city name and/or the like. As further example, the default event title may be a fixed default title established by the database 20 and/or the user of the media capturing device 30. Moreover, the default event title may be generated by another algorithm not specified here. The present invention should not be limited to a specific embodiment of the algorithm used to generate a default event title.

The metadata may have second content tags that are generated based on the specific event title as shown at step 105 of FIG. 2. The second content tags may be provided by the database 20. The second content tags of the metadata may be, for example, a creator, a publisher or a copyright owner of the digital media file, a genre associated with the digital media file, a type of sport for the event captured in the digital media file, a type of music recorded in the digital media file, a musical artist or band associated with the digital media file, a length of time of the digital media file, a website link, a review of the digital media file, a source of the digital media file and/or the like. Referring again to FIG. 1, a second terminal 22 may be in communication with a third server 13. The second terminal 22 may be local or may be remote with respect to the media capturing device 30 and/or the first terminal 14. The digital media file may be transferred, may be transmitted, may be shared and/or may be exchanged between the first terminal 14, the second terminal 22 and the media capturing device 30 via the first network 18. As a result, the users may access, may display, may view and/or may transmit the digital media file.

The second terminal 22 may be, for example, a computer terminal, a mobile device, a set-top box, a removable storage device and/or an electronic device which may be capable of transmitting, receiving, processing, accepting and/or displaying the multimedia and/or the metadata. The set-top box may be connected to a display (not shown in the figure) for viewing and/or for displaying the digital media file. The removable storage device may be capable of processing and/or executing software instructions for viewing and/or displaying the digital media file. It should be understood that the first terminal 14 and the second terminal 22 may be any terminal capable of transmitting, receiving, processing and/or displaying the digital media file known to one having ordinary skill in the art.

The second terminal 22 may be connected to and/or may be in communication with the media capturing device 30 via a second data communication network 40 (hereinafter "the second network 40"). The second network 40 may be, for example, an IP network, a wireless network, a wireline network, a personal area network, a local-area network, a metropolitan area network, a wide-area network, a paging network, a public switched telephone network and/or the like. The present invention should not be limited to a specific embodiment of the second network 40. It should be understood that the second network 40 may be any network capable of connecting and/or providing communication between the media capturing device 30 and the second terminal 22 as known to one having ordinary skill in the art.

The database 20 may provide the metadata associated with the digital media files. The first terminal 14 may access the specific event title and/or the content tags of the metadata associated with the digital media file via the first server 12 and/or the first network 18. The second terminal 22 may access the specific event title and/or the content tags of the metadata associated with the digital media file via the third server 13, and/or the second network 40. Availability of the digital media file may be indicated to the first terminal 14 and/or the second terminal 22 as a result of a search if terms of the search match the specific event title and/or the content tags. The first terminal 14 and/or the second terminal 22 may aggregate, store and/or organize the digital media files and/or the associated specific event titles, content tags, and/or other metadata. The first terminal 14 and/or the second terminal 22 may execute search queries in order to search their own internal media contents, media contents of the other terminal and/or media contents of a separate external site such as, for example, the second server 31 and/or a remote form of the database 20. The first terminal 14 and/or the second terminal 22 may store and/or may organize the digital media files based on the specific event title and/or the content tags without user involvement and/or without user action. As a result, the system 10 may store, may index, may transmit and/or may organize the digital media files based on the specific event title and/or the content tags.

The specific event title and/or the content tags may be created and/or associated with the digital media file at the media capturing device 30. Subsequently, the digital media file and/or the metadata may be transmitted using the first network and/or the second network 40. Alternatively, the digital media file may be transferred to the second server 31 and/or the first network 18 to obtain the metadata generated by use of the database 20. The association of the specific event title and/or the content tags with the digital media file may occur when the digital media file is created, or at a later time, when a connection with the second server 31 is established.

The first terminal 14 and/or the second terminal 22 may create and/or may store a content list as shown at step 106 of FIG. 2. The content list may have and/or may be based on the specific event title and/or the content tags of the metadata. A search of the content list may be performed using search terms as shown at step 107. Matching digital media files may have the specific event title and/or the content tags that match the search terms as shown at step 108. The matching digital media files may be accessed by, may be provided to, may be transferred to, may be downloaded to and/or may be transmitted to the first terminal 14, the second terminal 22 and/or the first network 18. The first terminal 14 and/or the second terminal 22 may display the digital media files for which the specific event title and/or the content tags match the search terms.

Users may use the first terminal 14 and/or the second terminal 22 to search the content list to identify, to access, to download and/or to consume the digital media files. For example, using the specific event title and/or the second content tags of the metadata, the users may acquire, may obtain and/or may create a list of digital photos captured at a specific event or venue, a list of songs by an artist, a list of episodes of a television program, games played by a specific sports team and/or movies made by an actor. The digital media file may be stored remotely relative to the first terminal 14 and/or the second terminal 22. The users may be required to have the right to consume the multimedia prior to accessing and/or to displaying the digital media file. The users may be required to subscribe and/or to maintain a subscription with the provider 16 prior to accessing and/or to displaying the digital media file.

The second terminal 22 may share, may transfer and/or may transmit the digital media file and/or the first tags of the metadata via the second network 40. The database 20 may be accessed by the second terminal 22 via the first network 18. Thus, the second terminal may obtain the digital media file via the second network 40 and subsequently associate the specific event title and/or the content tags with the digital media file.

The provider 16 connected to the first network 18 may be a content provider that may provide a social community website. The social community website is a web site and/or application that has content created primarily by users of the social community website. The content of the social community website may be shared with other users of the social community website. The social community website may provide forums for communication between the users. These services may include message boards, email lists, chat rooms, personal home pages and/or web logs. The users of the social community website may each have their own homepage that provides various digital media files. The first terminal 14 and/or the second terminal 22 may access the social community website from the provider 16 via the first network 18. The second terminal 22 may access the social community website from the provider 16 via the first network 18 and may access the media capturing device 30 via the second network 40 to upload the digital media file obtained from the media capturing device 30 to the social community website.

The users of the social community website may execute an application of the first terminal 14 and/or the second terminal 22 to locate, to identify and/or to search the digital media files of the social community website of provider 16. A searchable index of the media files may be used to locate the digital media files. The searchable index may be based on the specific event title and/or the content tags of the metadata. Based on the specific event title and/or the content tags of the metadata, the provider 16 may develop a specialized list of multimedia that may be related to a common interest of the users of the social community website. For example, the provider 16 may store a list of concert performances by a common musician. The list of concert performances may be identified from the specific event title and/or the content tags of the metadata of the digital media files. The provider 16 may transmit a communication to the users indicating that a new digital media file has been uploaded. A user that has designated matching keywords to the specific event title and/or the content tags of the new digital media file may receive a message indicating the availability of the new digital media file. The users may receive a periodic update of the the content list identifying the digital media files that have the specific event and/or the content tags matching the search terms of the users.

The specific event title may prevent search problems that arise from user-generated tags. For example, the user-generated tags may not have a name of the venue. A search using the name of the venue will not provide multimedia that have the user-generated tags that do not have the name of the venue. The specific event title and/or the content tags provided by the database 20 may prevent this problem by associating the digital media files for a specific event with a consistent title and/or by providing consistent content tags that have the relevant keywords.

The provider 16 may generate a webpage corresponding to one or more of the specific events. The webpage may accumulate digital media files related to the specific event. The digital media files related to the specific event may be provided on the webpage. The provider 16 may notify the users of the social community website about event-specific webpage updates if the users of the social community website have indicated interest in the specific event. Thus, a gallery of all of the digital media files related to the specific event may be displayed in one location of the social community website. The digital media files related to the specific event may be accessed from the webpage via hyperlinks to other websites of the social community website, for example. The digital media files corresponding to the specific event of the webpage may be provided on the webpage based on matching of the specific event and/or the content tags of the digital media files to the specific event of the webpage.

For example, the provider 16 of the social community website may generate a webpage corresponding to a specific concert performance. Based on the specific event titles of the digital media files stored at the social community website, the digital media files corresponding to the specific concert performance may be provided on the webpage corresponding to the specific concert performance. The users of the social community website who have indicated interest in a musician may be notified of the webpage and/or new digital media files on the webpage.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A system for creating metadata using a network and a media capturing device connected to the network wherein the media capturing device creates a first media file at a location at a time and a date and further wherein the media capturing device transmits the first media file to the network, the system comprising:
   a first content tag associated with the first media file wherein the first content tag identifies the time and the date that the first media file was created;
   a database of a plurality of events which stores event details for each of the plurality of events wherein the database uses the first content tag to identify the time and the date that the first media file was created and further wherein the database compares the time and the date that the first media file was created to the event details of one or more of the plurality of events wherein the database determines a matching event from the plurality of events based on comparison of the time and the date that the first media file was created to the event details of one or more of the plurality of events and further wherein the event details of the matching event correspond to the time and the date that the first media file was created and are not based on user input from a user of the media capturing device;

a second content tag which is associated with the first media file based on determination of the matching event for the first media file by the database; and a webpage for the matching event wherein media files having the second content tag are accessed from the webpage by remote users in response to user input into the webpage and further wherein the first media file is accessed by the remote users in response to user input into the webpage which selects the first media file from the media files.

2. The system of claim 1 wherein the database compares the location where the first media file was created to the event details of one or more of the plurality of events and further wherein the matching event is determined based on comparison of the location to the event details of one or more of the plurality of events.

3. The system of claim 1 further comprising:
a provider which maintains the webpage wherein the first media file is transmitted from the media capturing device to the provider and further wherein the first media file is transmitted from the provider to one of the remote users in response to the user input which selects the first media file from the media files.

4. The system of claim 1 further comprising:
a message transmitted to the remote users of the webpage that registered an interest in the media files having the second content tag wherein the message indicates a newly available media file that has the second content tag.

5. The system of claim 1 wherein the webpage is provided by a social community website and further wherein the remote users of the webpage have homepages provided by the social community website wherein the homepages provide the media files.

6. The system of claim 1 wherein the determination of the matching event for the first media file and association of the second content tag with the first media file occur automatically without user input from the user.

7. A computer-implemented method for creating metadata for media files created by a plurality of users wherein file information is associated with each of the media files and further wherein the file information identifies a location, a time and a date of creation of the corresponding media file wherein a database of events stores event information for each of the events and further wherein the event information identifies a location, a time and a date of the corresponding event wherein each of the events is associated with an event title and a content tag and further wherein a first event occurs at a venue and is associated with a first event title and a first content tag, the method comprising the steps of:

performing a comparison of the location, the time and the date of creation of a first media file of the media files to the location, the time and the date of one or more of the events;

using the comparison to determine if one of the events is a matching event for the first media file wherein the location, the time and the date of creation of the first media file of the media files corresponds to the location, the time and the date of the matching event, further wherein the comparison indicates that the first event is the matching event for the first media file, and further wherein the first event title is associated with the first media file in response to determination of the matching event for the first media file;

associating the matching event with the media files for which the location, the time and the date of creation correspond to the event information of the matching event and further wherein the first event is associated with the first media file;

associating the event title of the matching event with the media files associated with the matching event wherein the first event title is associated with the first media file; and associating the content tag of the matching event with the media files associated with the matching event wherein the first content tag is associated with the first media file.

8. The method of claim 7 further comprising the step of:
displaying a webpage for the first event wherein the webpage provides access to the media files for which the first event is the matching event.

9. The method of claim 7 further comprising the step of:
displaying a webpage for the venue associated with the first event wherein the webpage provides access to the media files which have matching events which took place at the venue associated with the first event and further wherein the webpage provides access to the first media file and to a second media file not associated with the first event.

10. The method of claim 7 wherein the first media file encodes audiovisual content.

11. The method of claim 7 wherein the media file is a digital photograph.

12. The method of claim 7 further comprising the step of:
associating a default event title with one of the media files if the database of events does not have the matching event for the media file wherein the default event title indicates a venue proximate to the location where the media file was created.

13. A computer-implemented method for creating metadata for a first media file created at a first location at a first time on a first date by a first media capturing device used by a first user wherein a database of events stores event details for each of the events and further wherein the event details specify a location, a time, and a date for each of the events, the method comprising the steps of:

performing a comparison of the first location, the first time, and the first date to the location, the time and the date associated with one or more of the events;

using the comparison to determine for the first media file a matching event from the events wherein the location, the time and the date identified by the event details of the matching event correspond respectively to the first location, the first time, and the first date, wherein the event details of the matching event are not based on user input from the first user; and associating a first content tag with the first media file wherein the first content tag is associated with the first media file based on the matching event.

14. The method of claim 13 further comprising the step of:
providing a webpage which provides access to a plurality of media files created by different users wherein each of the plurality of media files has the same matching event.

15. The method of claim 13 further comprising the step of:
comparing user input to content tags associated with media files wherein the first media file is provided if the first content tag associated with the first media file corresponds to the user input.

16. The method of claim 13 further comprising the step of:
creating a second media file on a second media capturing device used by a second user who is a different user than the first user wherein the first content tag associated with the first media file is associated with the second media file if the matching event for the second media file is the same event as the matching event for the first media file.

17. The method of claim 13 further comprising the steps of:
determining a matching event for a second media file created by a second media capturing device used by a second user wherein the database of events is used to determine the matching event for the second media file and further wherein the matching event for the second media file is determined without user input from the second user to specify the matching event and further wherein the matching event for the first media file is determined without user input from the first user to specify the matching event;

associating a second content tag with the second media file wherein the second content tag is associated with the second media file based on the matching event for the second media file; and organizing a plurality of media files based on associated content tags wherein the first media file and the second media file are included in the plurality of media files and are organized based on the first content tag and the second content tag respectively wherein the organizing of the plurality of media files is done without the involvement of the first user and the second user.

18. The method of claim 13 wherein the events are scheduled events.

19. The method of claim 13 wherein the matching event for the first media file is a sporting event and further wherein the first content tag specifies at least one of a title of the sporting event, a type of sport, a participant of the sporting event, and an outcome of the sporting event.

20. The method of claim 13 wherein the matching event for the first media file is a musical performance and further wherein the first content tag specifies at least one of a title of the musical performance, a musician participating in the musical performance, the venue of the musical performance, and the type of music of the musical performance.

* * * * *